(12) United States Patent
Lam

(10) Patent No.: US 6,175,165 B1
(45) Date of Patent: *Jan. 16, 2001

(54) HOST ELECTRONIC EQUIPMENT WITH INTERNAL POWER SUPPLY ADAPTED FOR SUPPLYING POWER DIRECTLY TO PERIPHERALS

(75) Inventor: Phillip Lam, Las Flores, CA (US)

(73) Assignee: A M Group, Corp, Irvine, CA (US)

( * ) Notice: Under 35 U.S.C. 154(b), the term of this patent shall be extended for 0 days.

This patent is subject to a terminal disclaimer.

(21) Appl. No.: 09/178,468

(22) Filed: Oct. 23, 1998

Related U.S. Application Data

(63) Continuation-in-part of application No. 08/789,841, filed on Jan. 29, 1997, now Pat. No. 5,777,397, which is a continuation-in-part of application No. 08/734,959, filed on Oct. 23, 1996, now Pat. No. 5,753,979, and a continuation-in-part of application No. 09/020,271, filed on Feb. 6, 1998, now Pat. No. 5,838,559.

(51) Int. Cl.$^7$ .................................................. H02J 3/12
(52) U.S. Cl. ........................ 307/28; 361/721; 361/748; 710/101
(58) Field of Search ..................... 307/28, 72, 38, 307/29, 75, 18; 700/298; 304/528.21; 301/716, 721, 736, 748; 710/101

(56) References Cited

U.S. PATENT DOCUMENTS 5,497,495 * 3/1996 Ishikawa et al. ................. 361/748
5,777,397 * 7/1998 Lam ................................. 307/28
5,991,839 * 11/1999 Ninomiya ........................ 710/101

* cited by examiner

Primary Examiner—Albert W. Paladini
(74) Attorney, Agent, or Firm—Herbert M. Shapiro

(57) ABSTRACT

Electrical equipment such as a personal computer includes a plurality of internal components which require different voltages including low voltages of about five volts for operation. The different voltages are supplied by an internal power supply, with a voltage regulator, which is itself connected to an appropriately transformed high voltage supply typically from an in-the-wall source. Peripherals such as a FAX/modem, CD ROM, or tape recorder are powered by cables plugged into mating sockets in the face of the computer housing. The sockets, in turn, are connected to the appropriate outputs of the internal power supply to obtain appropriate voltage power directly from the host computer in the absence of a transformed connection to a house supply. A switch may be provided at each of the sockets to vary the voltage there. The power supply may be mounted on the computer housing or it may be located away from the housing. In the later case, the power supply is connected by cable to a slot in the housing where (DC) sockets are provided. In one embodiment the cable actually comprises two cables, one connected to the sockets, the other to the power supply. The computer board provides convenient interconnects for electrically connecting the two cables.

9 Claims, 6 Drawing Sheets ing power for the peripheral 55
HOST ELECTRONIC EQUIPMENT WITH INTERNAL POWER SUPPLY ADAPTED FOR SUPPLYING POWER DIRECTLY TO PERIPHERALS

REFERENCE TO RELATED APPLICATIONS

This application is a continuation-in-part of application Ser. No. 08/789,841, filed Jan. 29, 1997 now U.S. Pat. No. 5,777,397 issued Jul. 7, 1998, which is a continuation-in-part of application Ser. No. 08/734,959 filed Oct. 23, 1996, now U.S. Pat. No. 5,753,979 issued May 19, 1998 and application Ser. No. 09/020,271 filed Feb. 6, 1998 now U.S. Pat. No. 5,838,559, issued Nov. 17, 1998.

FIELD OF THE INVENTION

This invention relates to electronic equipment to which peripheral equipment is connected for cooperative system operations.

BACKGROUND OF THE INVENTION

The market is replete with electronic equipment to which peripheral equipment is connected for cooperative action. The personal computer is one example of equipment to which peripheral equipment such as a FAX/modem and a LABEL scanner are connected for communication purposes. Another example is the television set to which a video cassette recorder (VCR) is connected; another, a stereo system. A tape drive, which might be connected to any of the above hosts, is a particularly familiar peripheral. Each piece of peripheral equipment is connected separately to an in-the-wall socket for power, as well as to the host, leading to a tangle of cords characteristic of any PC installation, stereo system or video system.

The peripherals often require different voltage levels for operation. Thus, five volt, nine volt, and 12 volt requirements are not uncommon. Consequently, not only are the power cords common but they typically also require transformers. The transformers, in turn, not only further complicate the tangle of cords, but they also are expensive and not entirely reliable. Most individuals with systems of this type often find themselves complaining about the mess of wires providing further impetus for the significant effort now being expended to develop wireless communication links between components. But still the tangle of power cords and transformers remains.

BRIEF DESCRIPTION OF THE INVENTION

The invention is based on the recognition that host equipment such as a personal computer, a television set or a stereo tuner has an internal power supply and a voltage regulator which already provides low voltage requirements for internal components and can be adapted to permit the requisite low voltage power to be supplied for the peripheral equipment directly from the host equipment rather than separately through transformers to an in-the-wall supply. In this manner, the tangle of cords, characteristic of such systems, is considerably simplified. To this end, provision is made in the housing of the host to provide a socket, or sockets, to which a peripheral piece of equipment can be connected for receiving directly from the host the low voltage power it requires. The socket(s) are connected electrically to the outputs of the internal power supply (or regulator) of the host for providing the low voltage needed to power the peripheral. In one embodiment, the power supply is mounted on the rear face of the computer. In another embodiment, the power supply is internal with a DC power cable connected to a slot at the rear face of the computer providing for at least one DC socket there.

BRIEF DESCRIPTION OF THE DRAWINGS

FIG. 9 is a schematic illustration of an internal power supply providing (DC) sockets at the rear of a host computer via a main board which provides easy interconnect there between.

DETAILED DESCRIPTION OF AN ILLUSTRATIVE EMBODIMENT OF THIS INVENTION

Figure 1:
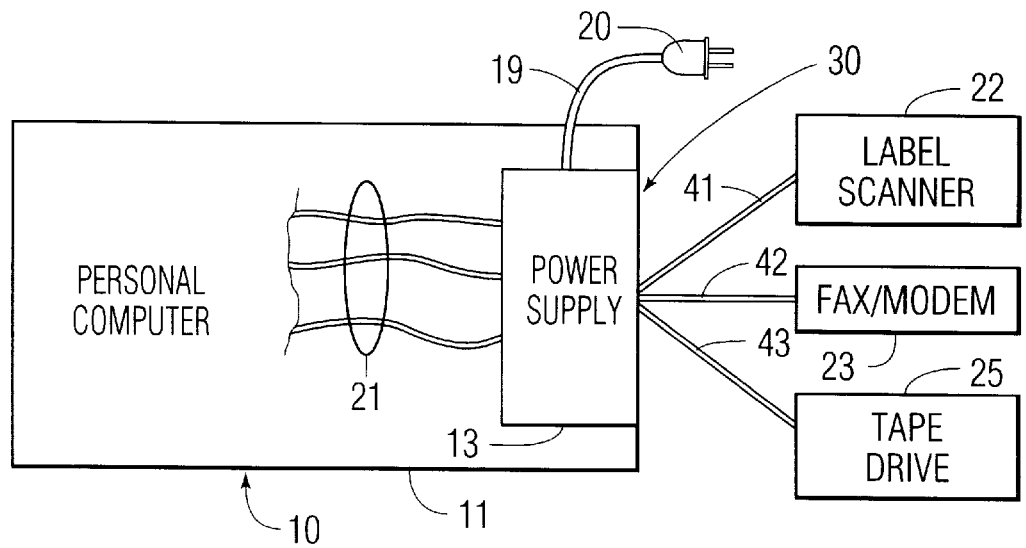
FIG. 1 is a block diagram of a personal computer system with a plurality of peripherals and an internal power supply with sockets for direct supply of power to associated peripherals.

FIG. 1 shows a personal computer 10 having a housing 11. A power supply 13 (with a voltage regulator (not shown)) is located within the housing. The power supply is connected to an in-the-wall socket (or equivalent) as indicated by cord 19 and plug 20. Power supply 13 is connected electrically to components (not shown) within the housing which constitute typical components for a computer for supplying power to those components as shown by wires 21. Typical peripherals for a computer are, for example, a LABEL scanner 22, a FAX/MODEM 23, and a tape drive (or CD ROM) 25 shown also connected to internal power supply 13.

Figure 2:
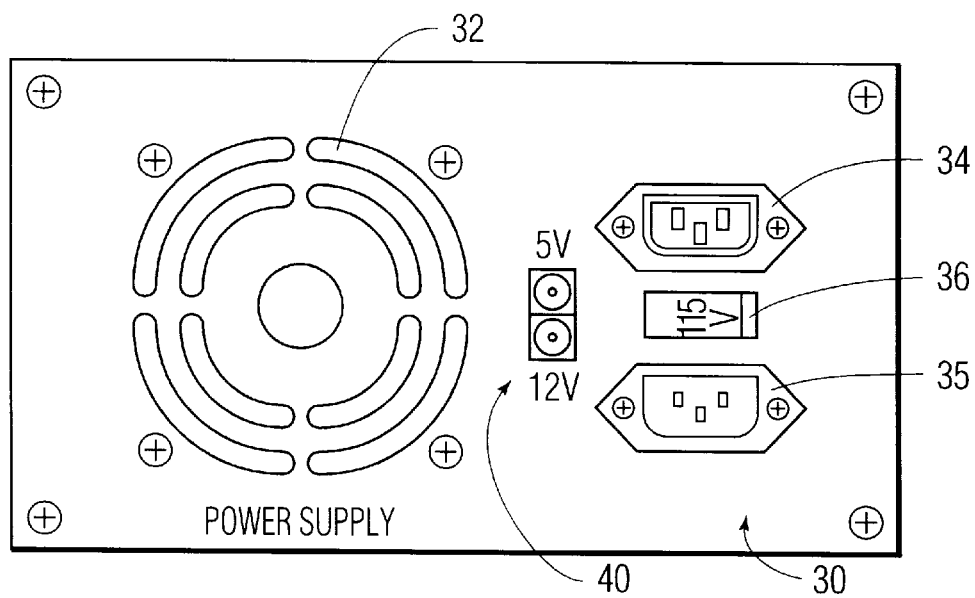
FIG. 2 is a schematic illustration of a portion of the computer of FIG. 1 showing sockets in the host computer housing for the direct supply of power to the peripherals in accordance with the principles of this invention.

FIG. 2 shows a face of a typical power supply for a personal computer. The power supply typically is secured within housing 11 with face 30 visible at an aperture in the computer housing.

The power supply includes a fan which is secured behind the pattern of curved openings 32. Also, plugs 34 and 35 are available for connection to the computer monitor and to wall power respectively. Typical power supplies also include a switch 36 for switching between 110 volt and 220 volt house supplies for the U.S. and for the European markets respectively.

But, in accordance with the principles of this invention, additional sockets 40 are provided in the computer housing, or in the face of the internal power supply if exposed at the computer housing, for direct connection of wires 41, 42, and 43 connecting the LABEL scanner, FAX/MODEM and tape drive respectively of FIG. 1 for supplying the low voltage requirements for those peripherals in the absence of connection to in-the-wall sockets and in the absence of transformers.

Each of sockets 40, illustratively, is shown as circular with a central pin for conforming to popular connector shapes for the illustrative peripherals. Of course, other connector shapes could be provided for connection to cables of alternative configurations. What is necessary, in accordance with the principles of this invention, is that low voltage outputs from a host's internal power supply are connected to newly provided sockets at the housing face of the host.

Figure 3:
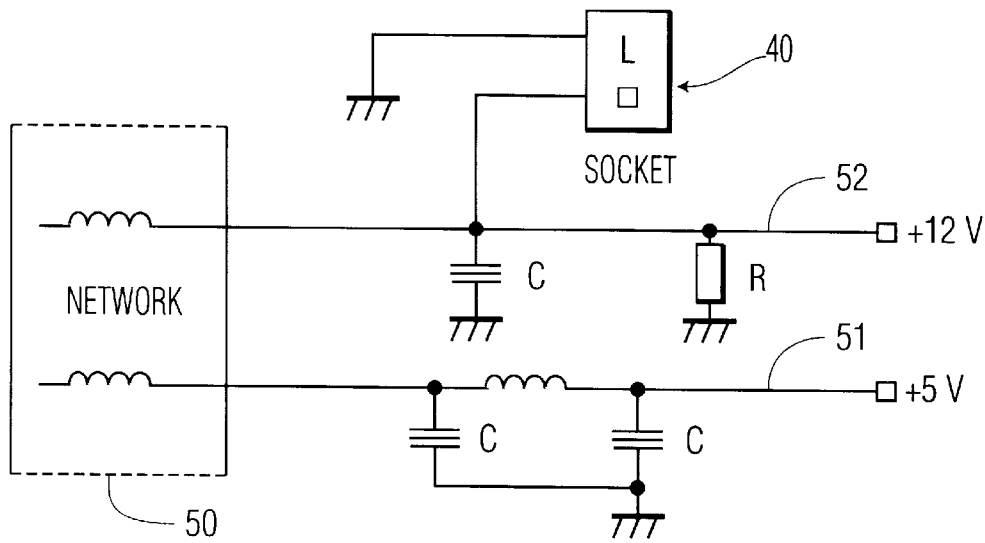
FIG. 3 is a circuit diagram of a portion of the system of FIG. 1.

FIG. 3 shows a portion of a circuit schematic for the output of an illustrative internal power supply. The power supply includes a network 50 which permits plus five volts and plus twelve (and/or nine) volts supplies, for example, to be connected to sockets 40 of FIG. 2 via lines 51 and 52 respectively.

Although the invention has been described in connection with a personal computer, FIG. 1 could just as well represent a stereo system with associated peripherals or a television system with a video cassette and the like. In each instance, additional sockets, or connectors, are provided at the housing face for external connection of peripherals for supplying power thereto.

Figure 4:
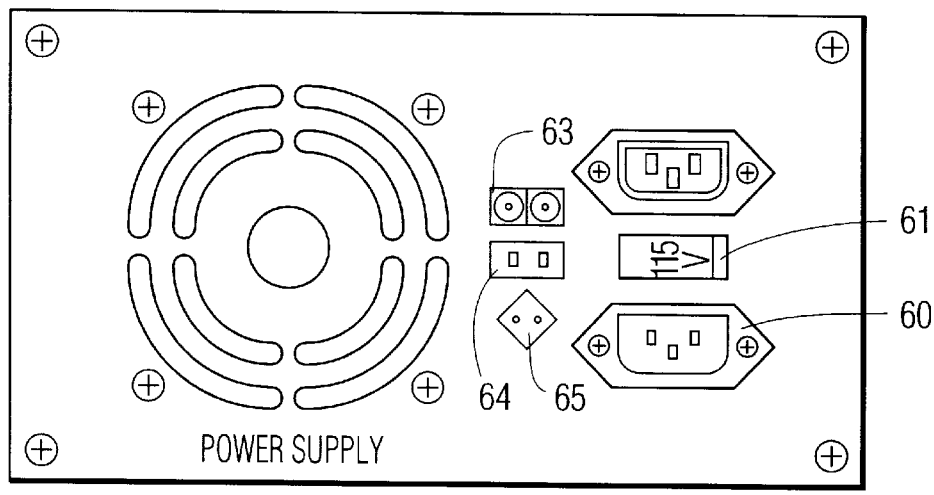
FIG. 4 is a schematic diagram of an alternative arrangement in accordance with this invention.

FIG. 4 shows an "internal" power supply similar to that shown in FIG. 2 where the sockets are of several different configurations. The arrangement includes a socket 60 for connection to house power as well as a switch 61 for selecting 110 or 220 volts. But, the sockets shown are circular (63) rectangular (64) and diamond shaped (65) for connection to cables of whatever shape dictated by the peripheral connector.

Figure 5:
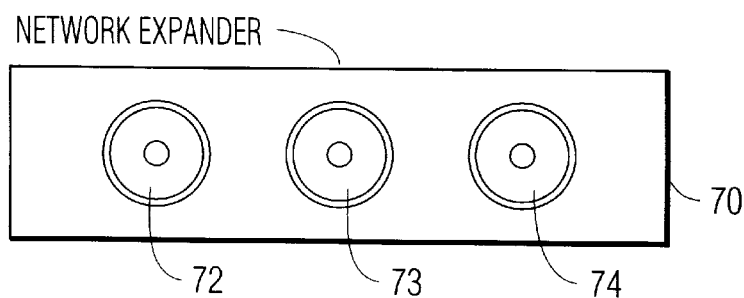
FIG. 5 is a schematic representation of a voltage expander for use with the arrangement of FIGS. 1, 2 and 4 in accordance with the principles of this invention.

If it is desirable for more auxiliary equipment to be powered from the host than there are receptacles, a voltage expander as shown in FIG. 5 may be used. Specifically, FIG. 5 shows an expander 70 with three receptacles 72, 73, and 74 each as shown, for example, at 40 in FIG. 2. The expander is configured to mate with one of the sockets (40), much in the manner of a triple plug mating with a wall socket, by a male plug on the reverse side (not shown) of the expander.

Figure 6:
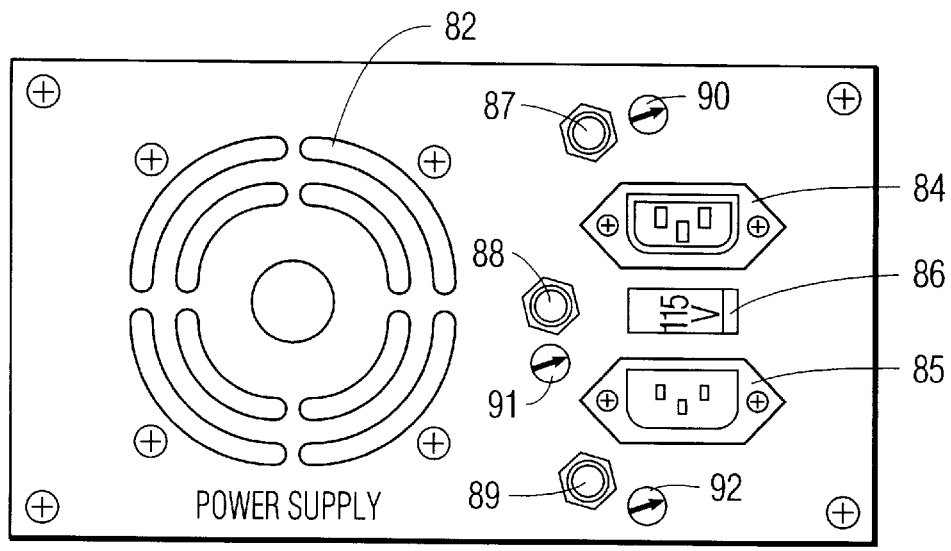
FIG. 6 is a block diagram of a power supply of the type shown in FIG. 2 illustrating the provision of variable voltage at the sockets of FIG. 2.

FIG. 6 illustrates an embodiment of this invention wherein a power supply configuration is of the type shown in FIG. 2 or FIG. 4 except that the voltage at each socket is variable. Specifically, the power supply includes a fan which occupies a position behind the pattern of curved openings 82. Also, plugs or sockets 84 and 85 are available for connection for the computer monitor and to wall power respectively. As was the case with the embodiment of FIG. 2, the power supply includes a switch 86 for switching between 110 volt and 220 volt house supplies for the U.S. and for the European markets, respectively.

In the embodiment of FIG. 6, each of the sockets 87, 88, and 89, for the external connection of peripheral equipment, is associated with a variable voltage control 90, 91, and 92, respectively, for selecting an appropriate voltage at the associated socket.

Figure 7:
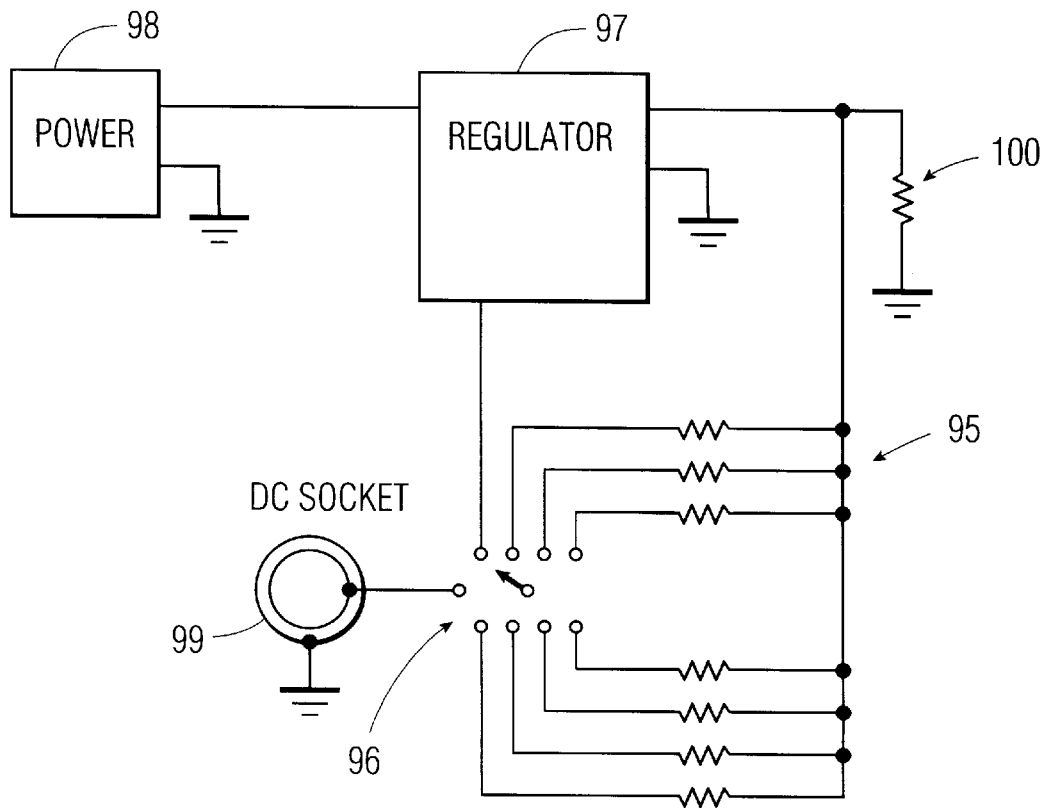
FIG. 7 is a circuit diagram showing a resistance network for the embodiment of FIG. 6.

FIG. 7 shows an illustrative resistor network 95 operable by switch 96 to select a voltage from voltage regulator 97 in a power supply 98 of the type shown in FIG. 2. Such a switch is exposed at the face of the power supply for user selection of the voltage at the sockets (87, 88, and 89) of FIG. 6 as represented by the double circle 99 in FIG. 7 there.

In one specific embodiment, the voltage regulator is commercially available as PQ30RV31 from SHARP Corporation and the resistors, from top to bottom, as viewed, are 7.3K, 3.4K, 2.4K, 2K, 1.5K, 1.2K, and 560 Ohms, providing 24V, 12V, 9V, 7.5V, 6V, 5V, and 3V, respectively. The switch (96) is a 1R5H6 switch and resistor 100 is 390 Ohms.

The resistor network is merely illustrative of a means for providing DC voltages. Solid state circuits which are software controlled also may be used, for example, for providing DC voltages.

Figure 8:
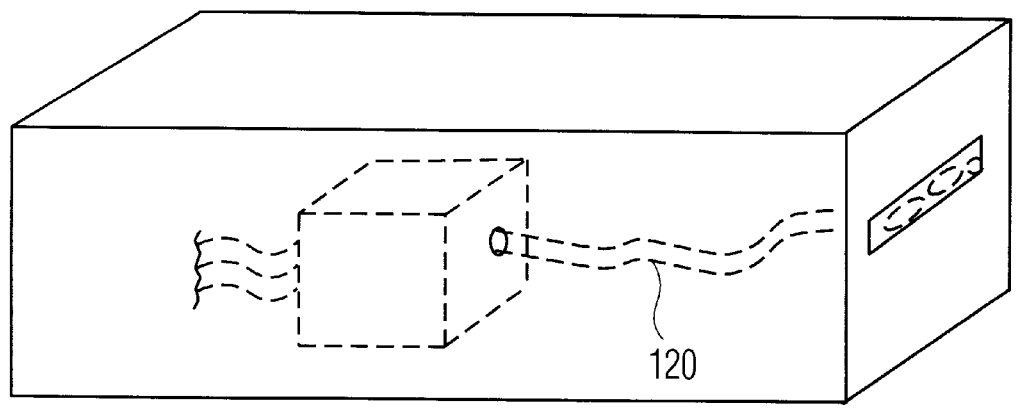
FIG. 8 is a schematic illustration of an internal power supply providing a (DC) cable to a slot in the rear of a host computer.
Figure 9:
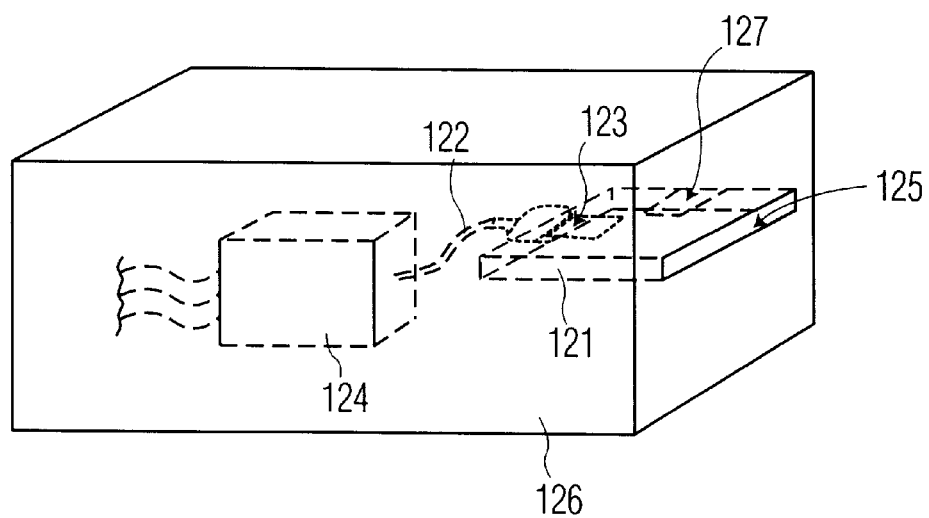

FIGS. 8 and 9 show alternate embodiments in accordance with the principles of this invention where an internal power supply in, for example, a computer is not mounted on the rear face of the computer but supplies DC power at the rear face directly by a cable 120 in FIG. 8 or via a board 121 in FIG. 9, the board providing a convenient connector site between cable 122 and sockets 123 defined in slot 125 at the rear of the computer 126. In the embodiment of FIG. 9, the board includes a DC/DC converter 127. Board 121 may comprise the computer mother board or a slot board or any board which provides a convenient site for a connector arrangement.

Figure 10:
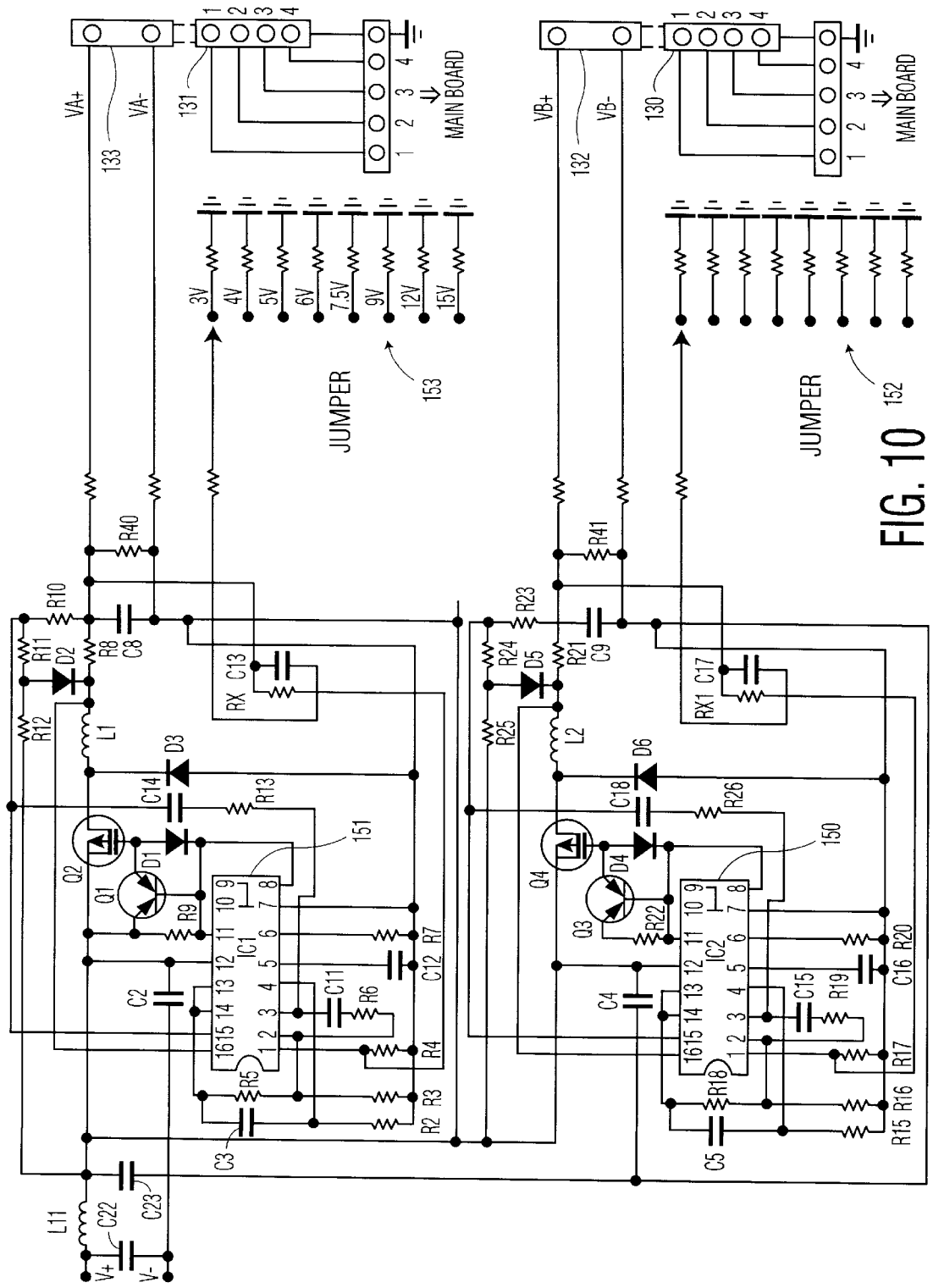
FIGS. 10 and 11 are a circuit diagram for providing DC power for the connectors in the embodiment of FIG. 9 and a circuit board layout for that embodiment respectively.

FIG. 10 shows a circuit schematic for providing DC voltages illustratively in the embodiment of FIG. 9. FIG. 10 shows the arrangement for connectors 130 and 131 and DC jacks 132 and 133. FIG. 10 also shows dashed lines between connectors 130 and 131 and the respective jacks 132 and 133 representing a pair of integrated sockets. The circuit arrangement of FIG. 10 includes DC/DC converters 150 and 151 and jumper sets 152 and 153 as shown.

Figure 11:
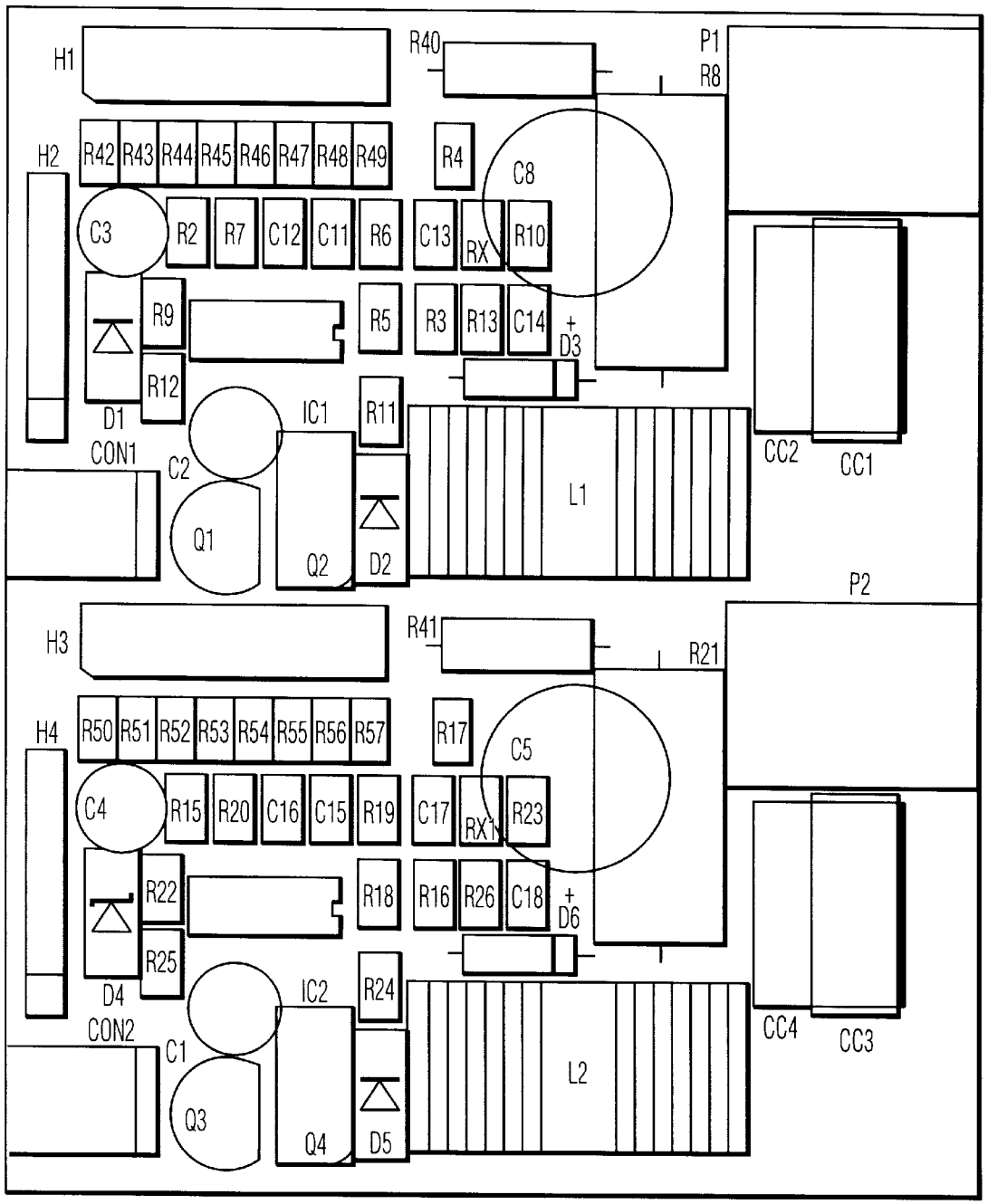

FIG. 11 shows a schematic top view of the board of FIG. 9 illustrating the component layout. The following table lists the part description and location of each component on the board. There are thirty-eight components on the board in the illustrative embodiment of FIGS. 9–11. The next to the bottom component (in the table-table-the connector) can be replaced by an integrated jack and socket for other standard applications.

| NO. | PART | TYPE | SIZE | USE | LOCATION |
|---|---|---|---|---|---|
| 1 | IC | PWM 1C TL494C | SMD | 2 | IC1.2 |
| 2 | TRANSISTOR | 2SC 945P TO-92 | TO-92 | 2 | Q1.3 |
| 3 | TRANSISTOR | MOSFET D1SP05 | PCHN | 2 | Q2.4 |
| 4 | DIODE | 1N4148 | SMD | 4 | D1.2.4.5 |
| 5 | FAST RECOVERY | DIODE PXPR1003 | | 2 | D3.6 |
| 6 | E-CAP | 2.2 uf/50V 105 | 5*11 | 2 | C2.4 |
| 7 | E-CAP | 10 uf/50v 105 | 5*11 | 2 | C3.5 |
| 8 | E-CAP | 470 uf/35V 85 | 10*20 | 2 | C8.9 |
| 9 | RESISTOR META | 0.15 ohm 2W 5% | | 2 | R8.21 |
| 10 | RESISTOR META | 1K ohm 3W 5% | | 2 | R40.41 |
| 11 | RESISTOR | 4.7K | 0805 | 4 | R1.5.14.18 |
| 12 | RESISTOR | 2.4K | 0805 | 3 | R2.15.24 |
| 13 | RESISTOR | 24K | 0805 | 2 | R3.16 |
| 14 | RESISTOR | 39K | 0805 | 2 | R6.19 |
| 15 | RESISTOR | 2.2K | 0805 | 3 | R7.20.22 |
| 16 | RESISTOR | 2.2K | 0805 | 2 | R9 |
| 17 | RESISTOR | 1.3K | 0805 | 2 | R10.23 |
| 18 | RFSISTOR | 3.9K | 0805 | 2 | R11.24 |
| 19 | RESISTOR | 10K | 8805 | 2 | R12.25 |
| 20 | RESISTOR | 1K | 0805 | 2 | R13.26 |
| 21 | RRSISTOR | 20K | 0805 | 2 | R4.17 |
| 22 | RESISTOR | 0 OHM | 0805 | 2 | R42.50 |
| 23 | RESISTOR | 22K | 0805 | 2 | R43.51 |

-continued

| NO. | PART | TYPE | SIZE | USE | LOCATION |
|---|---|---|---|---|---|
| 24 | RESISTOR | 18K | 0805 | 2 | R44.52 |
| 25 | RESISTOR | 11K | 0805 | 2 | R45.53 |
| 26 | RESISTOR | 7.5K | 0805 | 2 | R46.54 |
| 27 | RESISTOR | 5.6K | 0805 | 2 | R47.55 |
| 28 | RESISTOR | 3.6K | 0805 | 2 | R48.56 |
| 29 | RESISTOR | 2.8K | 0805 | 2 | R49.57 |
| 30 | CAPACITOR | 0.01 uf/50V SMD | 0805 | 5 | C11.12.13.15.16 |
| 31 | CAPACITOR | 0.01 uf/50V SMD | 0805 | 1 | C17 |
| 32 | CAPACITOR | 0.1 uf/50V SMD | 0805 | 2 | C14.18 |
| 33 | P.C.B 80*60* 1.6 DD BOARD PW002 U.S.B | | | 1 | P.C.B |
| 34 | CONNECTOR | 2PIN WITH BASE 3.96 mm | | 1 | CON1 |
| 35 | CONNECTOR | GS-201-1-7 | DIP | 2 | H2.H4 |
| 36 | CONNECTOR | GS-201-2-8 | DIP | 2 | H1.H3 |
| 37 | CONNECTOR | U.S.B CONNECTOR | | 2 | CC1.CC3 |
| 38 | CHOKE | TC5026 0.3 mm 160 uH | | 2 | L1.2 |

What is claimed is:

1. A system including a power supply for internal connection in said system, said system having a plurality of internal components which require different DC voltages for operation, said power supply having a plurality of wires for connection to respective ones of said components and including means for supplying said DC voltages via said wires, said system including a housing for containing said components, said housing including a slot and means for defining sockets at said slot, said power supply including a cable connected to said sockets and means for supplying DC power there.

2. System as in claim 1 also including a board, said power supply having a first cable for connection to said board, said system also including means for connecting said mother board to said sockets for supplying DC power there.

3. A system as in claim 1 wherein said slot defines a socket arrangement to mate with a connector and a jack.

4. A system as in claim 2 wherein said slot defines a socket arrangement to mate with a connector and a jack.

5. A system as in claim 1 wherein said slot defines a socket arrangement to mate with a connector including a jack.

6. A system as in claim 2 wherein said slot defines a socket arrangement to mate with a connector including a jack.

7. A system as in claim 1 wherein said means for supplying DC power at said sockets comprises a resistor network.

8. A system as in claim 2 wherein said means for supplying DC power at said sockets comprises a resistor network.

9. A system as in claim 2 wherein said board includes a DC/DC converter.

* * * * *